US011611261B2

(12) United States Patent
Kume et al.

(10) Patent No.: US 11,611,261 B2
(45) Date of Patent: Mar. 21, 2023

(54) ROTARY ACTUATOR

(71) Applicant: DENSO CORPORATION, Kariya (JP)

(72) Inventors: Mikine Kume, Kariya (JP); Shinji Naito, Kariya (JP)

(73) Assignee: DENSO CORPORATION, Kariya (JP)

( * ) Notice: Subject to any disclaimer, the term of this patent is extended or adjusted under 35 U.S.C. 154(b) by 373 days.

(21) Appl. No.: 16/847,989

(22) Filed: Apr. 14, 2020

(65) Prior Publication Data

US 2020/0336044 A1 Oct. 22, 2020

(30) Foreign Application Priority Data

Apr. 16, 2019 (JP) .............................. JP2019-077980

(51) Int. Cl.
*H02K 7/116* (2006.01)
*H02K 1/14* (2006.01)
(Continued)

(52) U.S. Cl.
CPC ............... *H02K 7/116* (2013.01); *F16H 1/28* (2013.01); *F16H 55/17* (2013.01); *F16H 61/32* (2013.01);
(Continued)

(58) Field of Classification Search
CPC .......... H02K 7/116; H02K 1/146; H02K 5/04; H02K 5/08; H02K 5/1732; H02K 7/083;
(Continued)

(56) References Cited

U.S. PATENT DOCUMENTS

2006/0097588 A1* 5/2006 Nakane ................. H02K 7/116
310/49.01
2012/0255385 A1* 10/2012 Nakayama ............ F16H 19/001
74/437

(Continued)

FOREIGN PATENT DOCUMENTS

JP 2009-162268 7/2009

OTHER PUBLICATIONS

U.S. Appl. No. 16/847,953, filed Apr. 14, 2020, Rotary Actuator.
(Continued)

*Primary Examiner* — John K Kim
(74) *Attorney, Agent, or Firm* — Nixon & Vanderhye P.C.

(57) ABSTRACT

A rotary actuator includes a motor, an output shaft, and a speed reducer. The motor includes a motor shaft rotating about an axial direction. The output shaft is disposed in parallel with the motor shaft. The speed reducer reduces a rotational speed of the motor and transmits rotation of the motor at a reduced rotational speed to the output shaft. The speed reducer includes a parallel-shaft type reducer that has a drive gear on the motor shaft and a driven gear on the output shaft. One side and the other side in the axial direction are defined as a first side and a second side, respectively. The motor is located on the first side of the speed reducer in the axial direction. The driven gear includes a teeth portion having a gear end surface on the first side of the teeth portion. The motor includes a stator having a stator end surface on the second side of the stator. The gear end surface is located on the first side of the stator end surface in the axial direction.

4 Claims, 5 Drawing Sheets

(51) Int. Cl.
*F16H 1/28* (2006.01)
*F16H 55/17* (2006.01)
*F16H 61/32* (2006.01)

(52) U.S. Cl.
CPC ....... *H02K 1/146* (2013.01); *F16H 2061/326* (2013.01)

(58) Field of Classification Search
CPC . H02K 11/33; H02K 3/34; H02K 7/10; H02K 11/215; H02K 11/30; F16H 1/28; F16H 55/17; F16H 61/32; F16H 2061/326; F16H 63/3425; F16H 63/3466; F16H 2001/325; F16H 1/32; F16H 59/08; F16H 61/0204; F16H 2001/327
USPC .......................................................... 310/83
See application file for complete search history.

(56) References Cited

U.S. PATENT DOCUMENTS

| | | | | |
|---|---|---|---|---|
| 2015/0159751 | A1* | 6/2015 | Pritchard | F16H 61/32 29/893.1 |
| 2015/0171709 | A1* | 6/2015 | Ito | H02K 15/14 310/52 |
| 2016/0156246 | A1* | 6/2016 | Hotori | H02K 5/225 310/43 |
| 2016/0301276 | A1* | 10/2016 | Saki | H02K 1/14 |
| 2018/0172133 | A1* | 6/2018 | Kume | F16H 57/021 |
| 2019/0207471 | A1* | 7/2019 | Uematsu | H02K 11/215 |
| 2019/0229588 | A1 | 7/2019 | Takahashi et al. | |
| 2020/0036266 | A1 | 1/2020 | Uematsu et al. | |
| 2020/0332874 | A1* | 10/2020 | Imai | F16H 61/32 |
| 2020/0336043 | A1* | 10/2020 | Kume | H02K 7/083 |
| 2020/0336044 | A1* | 10/2020 | Kume | F16H 63/3466 |
| 2021/0159758 | A1* | 5/2021 | Tokizaki | H02K 5/24 |

OTHER PUBLICATIONS

U.S. Appl. No. 16/847,974, filed Apr. 14, 2020, Rotary Actuator.
U.S. Appl. No. 16/847,989, filed Apr. 14, 2020, Rotary Actuator.
U.S. Appl. No. 16/847,788, filed Apr. 14, 2020, Rotary Actuator.
U.S. Appl. No. 16/847,801, filed Apr. 14, 2020, Rotary Actuator.
U.S. Appl. No. 16/847,820, filed Apr. 14, 2020, Rotary Actuator and Method of Manufacturing the Same.
U.S. Appl. No. 16/847,854, filed Apr. 14, 2020, Rotary Actuator.
U.S. Appl. No. 16/847,816, filed Apr. 14, 2020, Rotary Actuator.
U.S. Appl. No. 16/847,992, filed Apr. 14, 2020, Rotary Actuator.
U.S. Appl. No. 16/848,024, filed Apr. 14, 2020, Rotary Actuator.
U.S. Appl. No. 16/847,835, filed Apr. 14, 2020, Rotary Actuator.
U.S. Appl. No. 16/847,953, to Kume, et al., entitled: "Rotary Actuator", filed Apr. 14, 2020 (18 pages).
U.S. Appl. No. 16/847,974, to Kannou, et al., entitled: "Rotary Actuator", filed Apr. 14, 2020 (22 pages).
U.S. Appl. No. 16/847,788 to Kume, et al., entitled: "Rotary Actuator", filed Apr. 14, 2020 (22 pages).
U.S. Appl. No. 16/847,801, to Kume, et al., entitled: "Rotary Actuator", filed Apr. 14, 2020 (26 pages).
U.S. Appl. No. 16/847,820, to Kato, et al., entitled: "Rotary Actuator and Method for Manufacturing the Same", filed Apr. 14, 2020 (26 pages).
U.S. Appl. No. 16/847,854, to Naitou, et al., entitled: "Rotary Actuator", filed Apr. 14, 2020 (23 pages).
U.S. Appl. No. 16/847,816, to Imai, et al., entitled: "Rotary Actuator", filed Apr. 14, 2020 (27 pages).
U.S. Appl. No. 16/847,992, to Shimada, et al., entitled: "Rotary Actuator", filed Apr. 14, 2020 (24 pages).
U.S. Appl. No. 16/848,024, to Shimada, et al., entitled: "Rotary Actuator", filed Apr. 14, 2020 (18 pages).
U.S. Appl. No. 16/847,835, to Kannou, et al., entitled: "Rotary Actuator", filed Apr. 14, 2020 (18 pages).

* cited by examiner

ROTARY ACTUATOR

CROSS REFERENCE TO RELATED APPLICATION

This application is based on Japanese Patent Application No. 2019-077980 filed on Apr. 16, 2019, the disclosure of which is incorporated herein by reference in its entirety.

TECHNICAL FIELD

The present disclosure relates to a rotary actuator.

BACKGROUND

A rotary actuator is conventionally utilized as a driving unit of a shift-by-wire system for a vehicle. For example, an actuator has two shafts that are a motor shaft of a motor and an output shaft located in parallel with the motor shaft. A speed reducer is disposed in a driving force transmitting path extending between the motor and the output shaft. The speed reducer includes a parallel-shaft type reducer unit including a drive gear and a driven gear.

SUMMARY

One aspect of the present disclosure is a rotary actuator includes a motor, an output shaft, and a speed reducer. The motor includes a motor shaft rotating about an axial direction. The output shaft is disposed in parallel with the motor shaft.

The speed reducer reduces a rotational speed of the motor and transmits rotation of the motor at a reduced rotational speed to the output shaft. The speed reducer includes a parallel-shaft type reducer that has a drive gear on the motor shaft and a driven gear on the output shaft. One side and the other side in the axial direction are defined as a first side and a second side, respectively. The motor is located on the first side of the speed reducer. The driven gear includes a teeth portion having a gear end surface on the first side of the teeth portion. The motor includes a stator having a stator end surface on the second side of the stator. The gear end surface is located on the first side of the stator end surface in the axial direction.

DETAILED DESCRIPTION

To begin with, relevant technologies will be described only for understanding the following embodiments.

In order to mount a rotary actuator on a plurality of types of vehicular transmissions, it is necessary to ensure mountability under the restrictions caused by peripheral components. Therefore, there is a demand for downsizing the rotary actuator. On the other hand, the gear strength of the speed reducer is also required in consideration of the maximum torque during fail-safe operation and the release torque of the detent plate from the parking position, and it is necessary to secure a sufficient gear engaging length of the gear teeth portion. Therefore, the size of the motor or the speed reducer cannot be simply reduced. Hence, it is necessary to satisfy mountability and gear strength in a limited space at the same time.

The present disclosure has been provided in view of the above, and a rotary actuator that can secure a sufficient gear strength while improving moutability of the actuator is presented in the following embodiments.

As described above, one aspect of the present disclosure is a rotary actuator includes a motor, an output shaft, and a speed reducer. The motor includes a motor shaft rotating about an axial direction. The output shaft is disposed in parallel with the motor shaft.

The speed reducer reduces a rotational speed of the motor and transmits rotation of the motor at a reduced rotational speed to the output shaft. The speed reducer includes a parallel-shaft type reducer that has a drive gear on the motor shaft and a driven gear on the output shaft. One side and the other side in the axial direction are defined as a first side and a second side, respectively. The motor is located on the first side of the speed reducer. The driven gear includes a teeth portion having a gear end surface on the first side of the teeth portion. The motor includes a stator having a stator end surface on the second side of the stator. The gear end surface is located on the first side of the stator end surface in the axial direction.

In this way, the teeth portion of the driven gear and the stator are overlapped with each other in the axial direction by utilizing a radially inside space of the stator. Thus, the speed reducer can be located close to the motor. Therefore, the size of the actuator can be reduced in the axial direction by the overlapped amount between the driven teeth portion and the stator while ensuring a sufficient engaging length between the drive gear and the driven gear. Thereby, the mountability can be improved while securing the gear strength.

First Embodiment

Hereinafter, a rotary actuator (hereinafter, referred to as an actuator) according to an aspect of the present disclosure will be described with reference to drawings. The actuator is used for a driving unit of a shift-by-wire system for a vehicle.

(Shift-by-Wire System)

Figure 1:
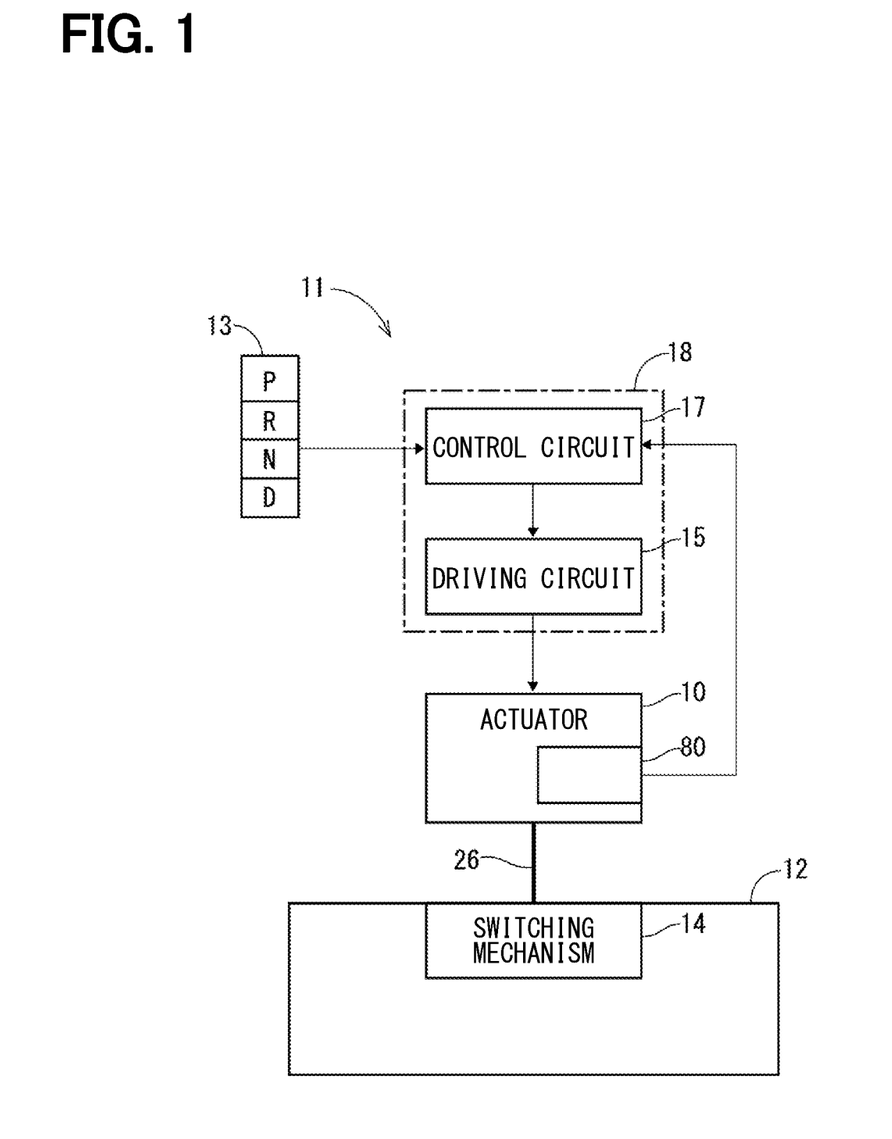
FIG. 1 is a schematic diagram showing a shift-by-wire system to which a rotary actuator according to a first embodiment is applied.

A configuration of the shift-by-wire system will be described with reference to FIGS. 1 and 2. As shown in FIG. 1, the shift-by-wire system 11 includes a shift operating device 13 that instructs a shift range of a transmission 12, the actuator 10 that drives a shift range switching mechanism 14 of the transmission 12, a driving circuit 15 that energizes the actuator 10, and a control circuit 17. The control circuit 17 controls the driving circuit 15 to drive the actuator 10 based on control signals for the shift range. The driving circuit 15 and the control circuit 17 configures an electronic control unit 18 (hereinafter, referred to as an ECU 18).

Figure 2:
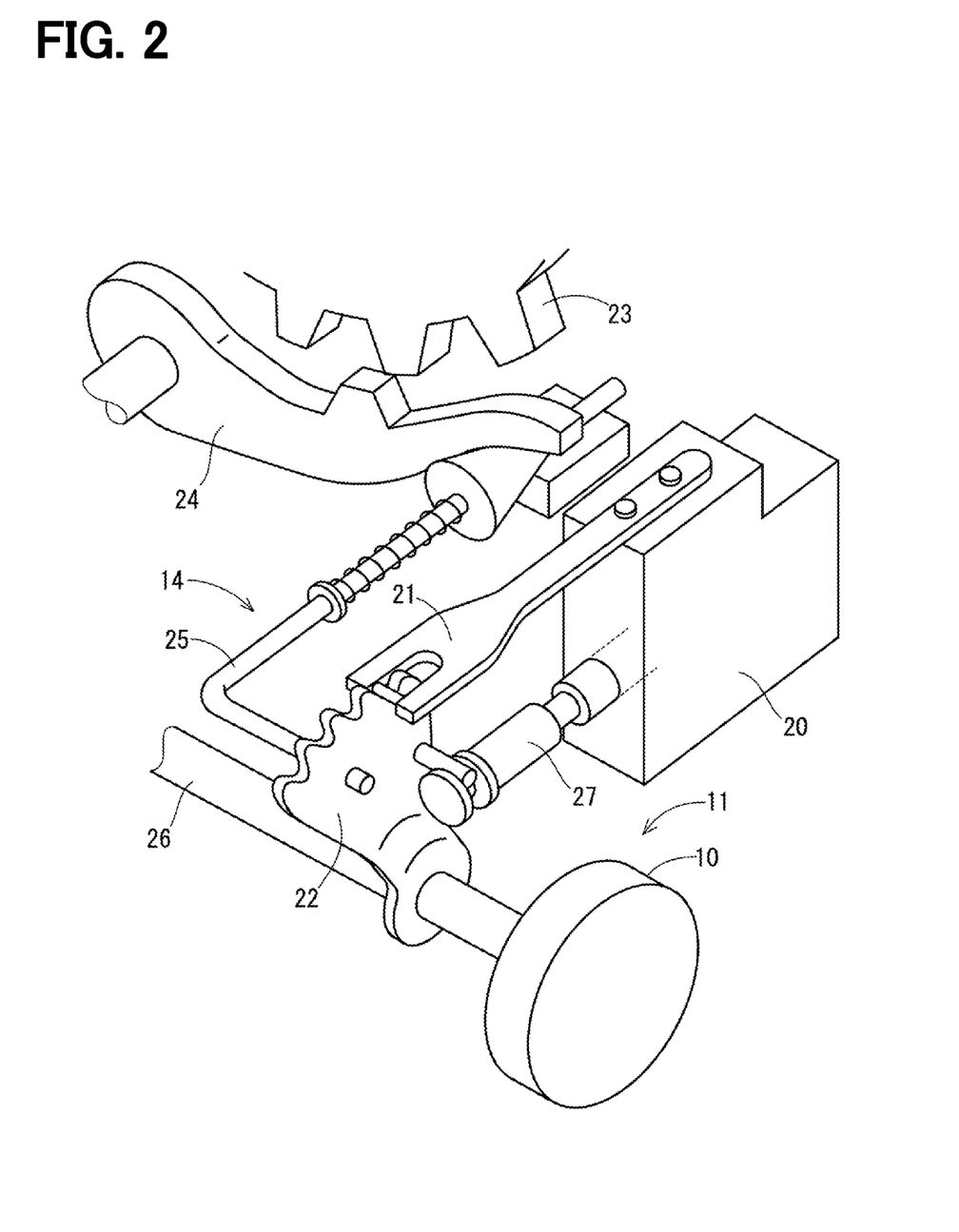
FIG. 2 is a diagram illustrating a shift range switching mechanism of FIG. 1.

As shown in FIG. 2, the shift range switching mechanism 14 includes a range switching valve 20, a detent spring 21, a detent lever 22, a park rod 25, and a manual shaft 26. The range switching valve 20 controls an oil pressure to a hydraulic operating mechanism in the transmission 12 as shown in FIG. 1. The detent spring 21 and the detent lever 22 are configured to hold the shift range. The park rod 25 restricts a rotation of the output shaft when the shift range is switched to a parking range by having a park pole 24 fit into a park gear 23 of the output shaft of the transmission 12. The manual shaft 26 rotates together with the detent lever 22.

The shift range switching mechanism 14 rotates the manual shaft 26 together with the detent lever 22 connected to the park rod 25 and a valve body 27 of the range switching valve 20 to shift the park rod 25 and the valve body 27 to positions corresponding to a target shift range. The shift-by-wire system 11 is connected to the actuator 10 to switch the shift range electrically.

(Actuator)

Figure 3:
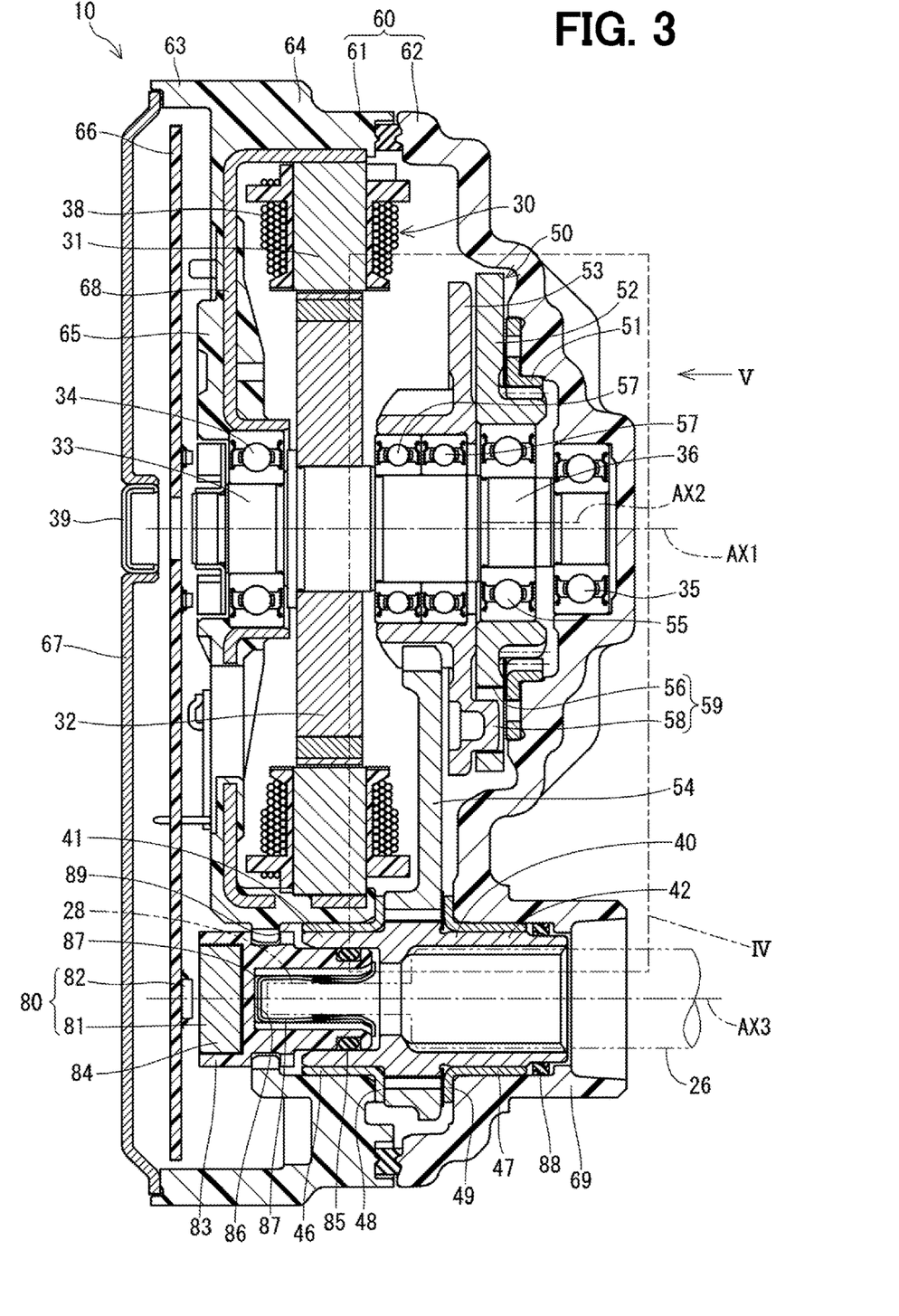
FIG. 3 is a cross-sectional view of the rotary actuator according to the first embodiment.

Next, a configuration of the actuator 10 will be described. As shown in FIG. 3, the actuator 10 includes a motor 30 as a driving source, an output shaft 40 disposed in parallel with the motor 30, a speed reducer 50, a case 60 housing the output shaft 40 and the speed reducer 50, and a rotational position detecting sensor 80. The speed reducer 50 is configured to reduce a rotational speed of the motor 30 and transmit the rotation of the motor 30 to the output shaft 40.

The case 60 includes an upper case 61 having a tubular shape and a lower case 62 having a cup shape. The upper case 61 houses the motor 30, and the lower case houses the speed reducer 50. The upper case 61 includes a partition 65 between one end 63 and the other end 64 of the upper case 61. The upper case 61 houses a control board 66 having the driving circuit and the control circuit (shown in FIG. 1) at a side of the partition 65 close to the one end 63. The control board 66 is fixed to the partition 65 by, for example, thermal fusing. The control board 66 is covered with a plate cover 67 made mainly of iron to secure shielding for the control board 66. The lower case 62 is assembled to the other end 64 of the upper case 61. The lower case 62 includes a tubular protrusion 69 protruding away from the upper case 61. The manual shaft 26 is inserted into the tubular protrusion 69.

The upper case 61 includes a plate case 68 at the other end 64. The motor 30 includes a stator 31 press-fit to the plate case 68 of the other end 64, a rotor 32 disposed inside the stator 31, and a motor shaft 33 configured to rotate about a rotary axis AX1 together with the rotor 32. The motor shaft 33 is rotatably supported by both a bearing 34 disposed at the plate case 68 and a bearing 35 disposed at the lower case 63. The motor shaft 33 includes an eccentric portion 36 that is deviated relative to the rotary axis AX1. The eccentric portion 36 is located between the rotor 32 and the lower case 62 in an axial direction. The control circuit (shown in FIG. 1) controls electricity applied to coils 38 configuring the stator 31, so that the motor 30 is rotatable in both directions and stoppable at desired positions. The plate cover 67 defines a through hole, and a plug 39 is attached into the through hole. If the actuator 10 is broken down, the motor shaft 33 can be rotated manually by detaching the plug 39.

The speed reducer 50 includes a first reducer 71 having a ring gear 51 and a sun gear 52, and a second reducer 72, as a parallel-shaft type reducer, having a drive gear 53 and a driven gear 54 that serve as so-called parallel shafts type gears. The ring gear 51 is coaxially disposed with the rotation axis AX1. The sun gear 52 is rotatably supported about an eccentric axis AX2 by a bearing 55 that is fit into the eccentric portion 36. The sun gear 52 is engaged with, and inscribed in, the ring gear 51. The sun gear 52 performs a planetary motion that the sun gear 52 revolves around the rotary axis AX1 and rotates about the eccentric axis AX2 during the rotation of the motor shaft 33. A rotational speed of the sun gear 52 is reduced relative to a rotational speed of the motor shaft 33. The sun gear 52 defines a hole 56 for transmitting a rotation of the motor shaft 33.

The drive gear 53 is coaxially disposed with the rotary axis AX1 and rotatably supported about the rotation axis AX1 by a bearing 57 that is fit into the motor shaft 33. The drive gear 53 includes a protrusion 58 to be inserted into the hole 56 to receive the rotation of the sun gear 52. The rotation of the sun gear 52 is transmitted to the drive gear 53 through engagement between the hole 56 and the protrusion 58. The hole 56 and the protrusion 58 serve as a transmitting mechanism 59. The driven gear 54 is coaxially disposed with a rotation axis AX3 that is parallel with the rotation axis AX1 and on the same axis with the tubular protrusion 69, and is engaged with and circumscribed on the drive gear 53. The driven gear 54 rotates about the rotation axis AX3 in response to the rotation of the drive gear 53 about the rotation axis AX1. A rotational speed of the driven gear 54 is reduced relative to the rotational speed of the drive gear 53.

The output shaft 40 is formed into a cylindrical shape and coaxially disposed with the rotation axis AX3. The partition 65 defines a supporting through hole 89 coaxial with the rotation axis AX3. The output shaft 40 is rotatably supported about the rotation axis AX3 by both a first collar bushing 46 and a second collar bushing 47. The first collar bushing 46 and the second collar busing 47 are fit into the supporting through hole 89 and the tubular protrusion 69, respectively. The driven gear 54 is a different component from the output shaft 40. The driven gear 54 is mechanically connected to the output shaft 40 by being fit to an outer part of the output shaft 40 to transmit the torque to the output shaft. The manual shaft 26 is inserted into the output shaft 40 and connected to the output shaft by, for example, a spline fitting to receive the rotary force.

An end 41 of the output shaft 40 is rotatably supported by the first collar bushing 46. The other end 42 of the output shaft 40 is rotatably supported by the second collar bushing 47. The driven gear 54 is supported in an axial direction of the output shaft 40 by being clamped between a first collar 48 of the first collar bushing 46 and a second collar 49 of the second collar bushing 47. In other embodiment, the driven gear 54 may be supported in the axial direction by being clamped between a pair of supporters formed of the case 60, other plates, or the like.

The rotational position detecting sensor 80 includes a magnetic circuit 81 and a magnetic sensor 82. The magnetic circuit 81 is attached to the output shaft 40. Specifically, the magnetic circuit 81 is integrally formed with a holder 83 and a magnet 84. A position of the holder 83 in a thrust direction of the holder 83 is restricted by the upper case 61 and a position of the holder 83 in a radial direction of the holder 83 is also restricted by the output shaft. The rotational position detecting sensor 80 detects rotational positions of the output shaft 40 and the manual shaft 26 rotating together with the output shaft 40, and outputs detection results to the ECU 18. In other embodiments, the magnetic circuit may be disposed at the output shaft 40 or an element rotating together with the output shaft 40 (e.g., the manual shaft). The holder of the magnetic circuit may be integrally formed with the output shaft 40 or the manual shaft 26, and the magnet of the magnetic circuit may be fixed to the holder by adhesion or integral molding.

The holder 83 is inserted into the end 41 of the output shaft 40. An O-ring 85 is disposed between the holder 83 and the end 41. The holder 83 defines a bottomed hole 86 at an end of the holder 83 facing the output shaft 40. A spring 87 is fit into the bottomed hole 86. The spring 87 holds a dihedral width part 28 formed at an end of the manual shaft 26 by a spring force in a direction to reduce a space between the manual shaft 26 and the bottomed hole 86.

An X-ring 88 is disposed between the other end 42 of the output shaft 40 and the tubular protrusion 69. Conventionally, a sealing member sealed a space between the transmission of the actuator and a transmission case. In this disclosure, however, the X-ring 88 is disposed between the other end 42 and the tubular protrusion 69, thus sealing between the other end 42 and the tubular protrusion 69 is secured without an additional sealing member as conventionally used.

(Speed Reducer)

Figure 4:
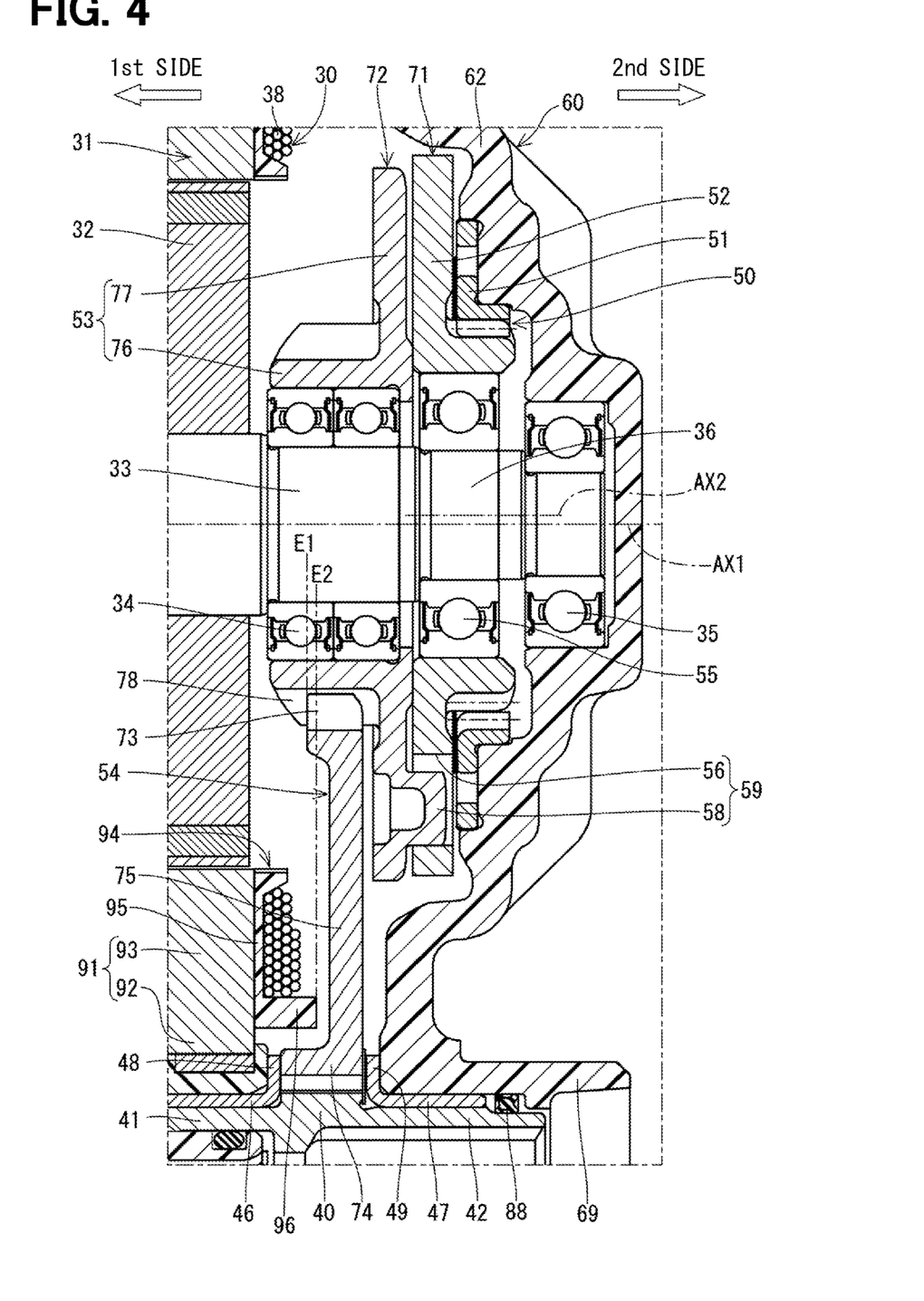
FIG. 4 is an enlarged view of IV part in FIG. 3.

Next, a configuration of the speed reducer 50 and related parts will be described. As shown in FIG. 4, the ring gear 51 is fixed to the lower case 62 by press-fitting in this embodiment. In another embodiment, the ring gear 51 may be insert-molded with the lower case 62, or fixed with fastening members such as screws.

The drive gear 53 is located between the motor 30 and the first reducer 71 in the axial direction of the motor 30. That is, the drive gear 53 is located in a space between the motor 30 fixed to the upper case 61 and the first reducer 71 fixed to a bottom part of the lower case 62. Accordingly, the drive gear 53 and the ring gear 51 do not directly face each other in the axial direction.

The driven gear 54 has a driven teeth portion 73 that meshes with the drive gear 53, a connecting portion 74 fitted to the output shaft 40 to transmit rotation, and a plate 75 that connects the connecting portion 74 and the driven teeth portion 73. The connecting portion 74 and the driven teeth portion 73 are arranged to overlap with each other in the radial direction.

The sun gear 52 defines the hole 56 for the transmitting mechanism 59, and the drive gear 53 includes the protrusion 58. The hole 56 overlaps with the bearing 55 supporting the sun gear 52 in the axial direction. Similarly, the fitting portion between the protrusion 58 and the hole 56 overlaps with the bearing 55 in the axial direction.

The drive gear 53 includes a protrusion formed as a difference between a small diameter portion 76 and a large diameter portion 77. The small diameter portion 76 is located between the motor 30 and the large diameter portion 77. In other words, the small diameter portion 76 is located on a side of the large diameter portion 77 opposite to the sun gear 52. The protrusion 58 protrudes from an outer circumferential surface of the large diameter portion 77 in the axial direction. The drive gear 53 includes a drive teeth portion 78 engaged with the driven gear 54 at a position inward of the protrusion 58 in the radial direction of the motor 30. The drive teeth portion 78 does not entirely extend in the axial direction of the drive gear 53. In other words, the drive teeth portion 78 extends up to a middle position of the drive gear 53 in the axial direction.

In the following description, one side in the axial direction and the other side in the axial direction are defined as a first side and a second side, respectively, as shown in FIG. 4. Thus, the motor 30 is located on the first side of the speed reducer 50.

A gear end surface E1 of the driven teeth portion 73 of the driven gear 54 on the first side of the driven teeth portion 73 in the axial direction is located on the first side of a stator end surface E2 of the stator 31 on the second side of the stator 30. That is, the driven teeth portion 73 and the stator 31 are arranged to overlap with each other in the axial direction.

The plate 75 is located on the second side of the stator end surface E2 of the stator 31 in the axial direction. The plate 75 has a linear shape extending in the radial direction from the connecting portion 74 to the driven teeth portion 73. The driven teeth portion 73 has a thickness in the axial direction that is greater than that of the plate 75. The driven teeth portion 73 does not protrude toward the second side of the plate 75, but protrudes only toward the first side of the plate 75 in the axial direction (i.e., toward the stator 31).

Figure 5:
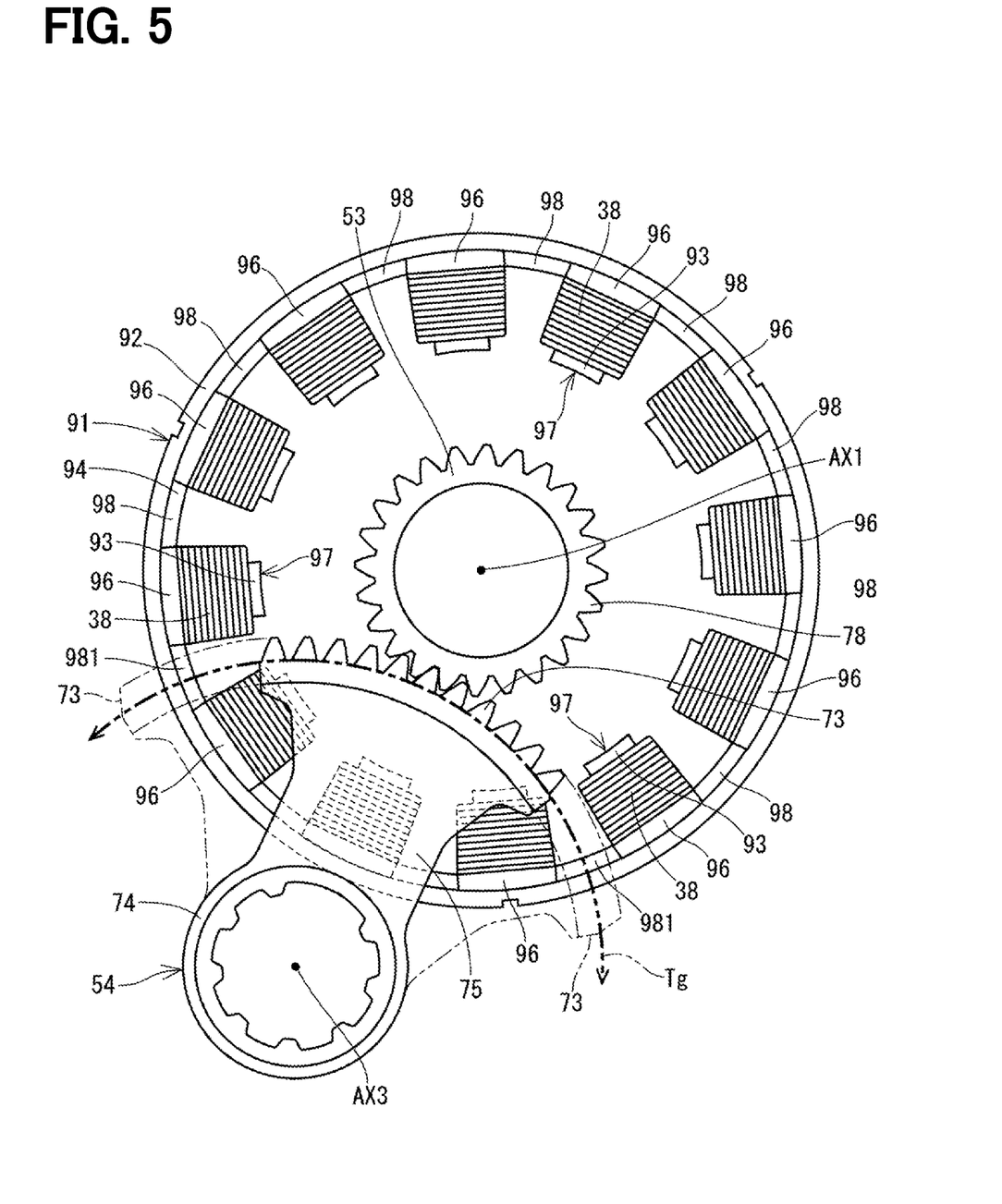
FIG. 5 is a view of a stator and a driven gear viewed in V direction in FIG. 3.

As shown in FIGS. 3 to 5, the stator 31 has a stator core 91, an insulator 94 made of an insulating material and mounted on the stator core 91, and a plurality of coils 38 each of which is wound around a respective bobbin 95 of the insulator 94. The stator core 91 has an annular back yoke 92 and a teeth portion 93 protruding radially inward of the back yoke 92. The insulator 94 is mounted to cover the stator core 91.

The insulator 94 includes a plurality of protrusions 96 on the second side of the insulator 94 in the axial direction. Each of the plurality of protrusions 94 holds the coil 38 at a position radially outside of the coil 38. The protrusion 96 is provided corresponding to a slot 97 that is formed of the teeth portion 93, the bobbin, and the coil 38. The protrusions 96 are arranged in a circumferential direction at predetermined intervals.

The stator 31 has gaps 98 on the second side of the stator 31 in the axial direction at positions between the slots 97. The gaps 98 are arranged to be spaced away from each other in the circumferential direction to form an imaginary circle. Here, two specified gaps 981 among the gaps 98 are defined below. Each of the two specified gaps 981 is located between a pair of the protrusions 96 where a trajectory Tg described by the driven teeth portion 73 when the driven gear 54 is rotating passes through. In other words, the two specified gaps 981 are positioned on the trajectory Tg as shown in FIG. 5. The driven teeth portion 73 passes through the specific gaps 981 when the driven gear 54 rotates. In other words, the two gaps 981 allow the driven teeth portion 73 to swing (move) by allowing the driven teeth portion 73 to pass through the two gaps 981.

As described above, in the first embodiment, the actuator 10 includes the motor 30, the output shaft 40 disposed in parallel with the motor shaft 33 of the motor 30, and the speed reducer 50 that reduces a rotational speed of the motor 30 and transmits rotation of the motor 30 at a reduced rotational speed to the output shaft 40.

The speed reducer 50 includes the parallel-shaft type reducer (i.e., the second reducer) 72 that has the drive gear 53 on the motor shaft 33 and the driven gear 54 on the output shaft 40. The gear end surface E1 of the driven teeth portion 73 of the driven gear 54 on the first side of the driven teeth portion 73 in the axial direction is located on the first side of the stator end surface E2 of the stator 31 on the second side of the stator 30.

In this way, the driven teeth portion 73 of the driven gear 54 and the stator 31 are overlapped with each other in the radial direction by utilizing a radially inside space of the stator 31. Thus, the speed reducer 50 can be located close to the motor 30. Therefore, the size of the actuator 10 can be reduced in the axial direction by the amount of the overlap between the driven teeth portion 73 and the stator 31 while ensuring a sufficient engaging length between the drive gear 53 and the driven gear 54. Thereby, the mountability and vibration resistance can be improved while securing the gear strength.

Further, in the present embodiment, the driven gear 54 includes the driven teeth portion 73 meshing with the drive gear 53, the connecting portion 74 capable of transmitting rotation to the output shaft 40, and the plate 75 connecting the driven teeth portion 73 and the connecting portion 74.

The driven teeth portion 73 has the thickness in the axial direction that is greater than that of the plate 75. By increasing the thickness of the driven teeth 73 only, which is necessary for improving the gear strength, the gear weight and inertia can be reduced, and the vibration resistance, responsiveness, and position controllability are improved.

To secure a certain gear strength, carburizing may be applied, but there would be a concern that the precision of the gear teeth cannot be secured due to heat treatment distortion. Therefore, by increasing the thickness of the driven teeth portion 73 only in this embodiment, a sufficient engaging length can be secured, and the gear strength can be increased.

In the present embodiment, the driven teeth portion 73 protrudes only the first side of the plate 75 in the axial direction. As a result, the speed reducer 50 can be disposed as close to the motor 30 as possible, as compared with a situation in which the driven teeth portion 73 protrudes toward both sides in the axial direction.

Further, in the present embodiment, the speed reducer 50 includes (i) the first reducer 71 that includes the ring gear 51 and the sun gear 52 and that reduces rotation of the motor shaft 33 and (ii) the second reducer 72 that is disposed between the motor 30 and the first reducer 71 in the axial direction and that reduces the output rotation from the first reducer 71. The plate 75 has a linear shape extending in the radial direction from the connecting portion 74 to the driven teeth portion 73. Conventionally, it was necessary to make the plate a stepped shape due to the restriction of the arrangement of speed reducers. According to the present embodiment, the plate 75 is formed in a linear shape by arranging reducers as described above. Hence, the gear weight and inertia of the driven gear 54 can be reduced, and the vibration resistance, responsiveness, and position controllability are improved. Further, the plate 75 having a linear shape can be easily manufactured.

In the present embodiment, the stator 31 has the specific gaps 981 on the second side of the stator 31 in the axial direction at positions between the slots 97 of the stator 31. The driven teeth portion 73 passes through the specific gaps 981 when the driven gear 54 rotates. Accordingly, it is possible to effectively utilize the space and secure the gear engaging length without expanding the size of the speed reducer 50 in the axial direction.

In the present embodiment, the stator 31 includes the insulator 94 having a plurality of protrusions 96 on the second side of the stator 31 in the axial direction. Each of the plurality of protrusions 96 holds the coil 38 at a position radially outside of the coil 38. Each of the two specified gaps 981 is located between a pair of the protrusions 98 where the trajectory Tg described by the driven teeth portion 73 when the driven gear 54 is rotating passes through. In other words, the two specified gaps 981 are positioned on the trajectory Tg. Thereby, spaces on both sides of the driven gear 54 in a rotational direction can be effectively utilized, and a sufficient gear engaging length can be secured without expanding the speed reducer 50 in the axial direction.

Other Embodiments

In another embodiment, the speed reducer may have at least a parallel shaft type speed reduction portion. In yet another embodiment, the driven gear may be formed as a single member with the output shaft. Further, in yet another embodiment, a hole may be formed in the drive gear, and a protrusion may be formed in the sun gear. In yet another embodiment, the teeth portion may be located radially outside of the protrusions.

The present disclosure is not limited to the embodiments described above, and can be implemented in various forms without departing from the spirit of the invention.

The invention claimed is:

1. A rotary actuator used in a shift-by-wire system for a vehicle, the actuator comprising:
   a motor that includes a motor shaft rotating about an axial direction;
   an output shaft that is disposed in parallel with the motor shaft; and
   a speed reducer that reduces a rotational speed of the motor and transmits rotation of the motor at a reduced rotational speed to the output shaft, wherein
   the speed reducer includes a parallel-shaft type reducer that has a drive gear on the motor shaft and a driven gear on the output shaft,
   one side and the other side in the axial direction are defined as a first side and a second side, respectively,
   the driven gear includes a teeth portion having a gear end surface,
   the motor includes a stator having a stator end surface on the second side of the stator,
   the gear end surface is located on the first side of the stator end surface in the axial direction,
   the stator defines a gap at a position between slots of the stator on the second side of the stator,
   the teeth portion is configured to move when the driven gear rotates such that the teeth portion pass through the gap,
   the stator includes an insulator having a plurality of protrusions on the second side of the stator in the axial direction,
   each of the plurality of protrusions holds a coil of the stator at a position radially outside of the coil,
   the gap is two gaps formed between two pairs of the plurality of protrusions, and
   the two gaps are located on a trajectory described by the teeth portion when the driven gear is rotating.

2. The rotary actuator according to claim 1, wherein
   the driven gear includes the teeth portion that meshes with the drive gear, a connection portion that is capable of transmitting rotation to the output shaft, and a plate that connects the teeth portion and the connection portion, and
   the teeth portion has a thickness in the axial direction greater than that of the plate.

3. The rotary actuator according to claim 2, wherein
   the teeth portion protrudes from the plate only toward the first side in the axial direction.

4. The rotary actuator according to claim 2, wherein
   the speed reducer includes:
      a first reducer that has a ring gear and a sun gear to reduce a rotational speed of the motor shaft; and
      the parallel-shaft type reducer, as a second reducer, that is disposed between the motor and the first reducer in the axial direction and that reduces an output rotation from the first reducer, and
   the plate has a linear shape extending in a radial direction from the connection portion to the teeth portion.

\* \* \* \* \*